US012636950B2

(12) United States Patent
Wetzel et al.

(10) Patent No.: US 12,636,950 B2
(45) Date of Patent: May 26, 2026

(54) CAPLESS CLOSURE ASSEMBLY FOR FUEL-TANK FILLER PIPE

(71) Applicant: Stant USA Corp., Connersville, IN (US)

(72) Inventors: Paul C. Wetzel, Oxford, OH (US); Arzan Varachhawala, Oxford, OH (US)

(73) Assignee: Stant USA Corp., Connersville, IN (US)

( * ) Notice: Subject to any disclaimer, the term of this patent is extended or adjusted under 35 U.S.C. 154(b) by 52 days.

(21) Appl. No.: 18/909,699

(22) Filed: Oct. 8, 2024

(65) Prior Publication Data

US 2025/0033460 A1 Jan. 30, 2025

Related U.S. Application Data

(63) Continuation of application No. 17/592,477, filed on Feb. 3, 2022, now Pat. No. 12,179,578.

(60) Provisional application No. 63/177,173, filed on Apr. 20, 2021, provisional application No. 63/145,974, filed on Feb. 4, 2021.

(51) Int. Cl.
B60K 15/04 (2006.01)

(52) U.S. Cl.
CPC ...... B60K 15/04 (2013.01); *B60K 2015/0461* (2013.01); *B60K 2015/048* (2013.01)

(58) Field of Classification Search
CPC ............ B60K 15/04; B60K 2015/0461; B60K 2015/0429
See application file for complete search history.

(56) References Cited

U.S. PATENT DOCUMENTS

| | | | |
|---|---|---|---|
| 5,056,570 A | 10/1991 | Harris et al. | |
| 5,271,438 A | 12/1993 | Griffin et al. | |
| 5,730,194 A | 3/1998 | Foltz | |
| 5,732,840 A | 3/1998 | Foltz | |
| 6,155,316 A * | 12/2000 | Benjey | B60K 15/04 |
| | | | 141/348 |
| 6,189,581 B1 | 2/2001 | Harris et al. | |
| 6,431,228 B2 | 8/2002 | Foltz et al. | |
| 6,679,396 B1 | 1/2004 | Foltz et al. | |
| 6,691,750 B1 | 2/2004 | Foltz | |
| 6,755,057 B2 | 6/2004 | Foltz | |
| 6,923,224 B1 | 8/2005 | Mcclung et al. | |
| 6,942,117 B2 | 9/2005 | Foltz | |
| 7,246,642 B2 | 7/2007 | Foltz et al. | |
| 7,882,862 B2 | 2/2011 | Decapua et al. | |
| 9,701,194 B2 | 7/2017 | Groom | |
| 9,873,322 B2 | 1/2018 | Frank et al. | |
| 10,000,117 B2 | 6/2018 | Giles et al. | |
| 10,065,496 B2 | 9/2018 | Frank et al. | |
| 10,226,996 B2 | 3/2019 | Giles et al. | |
| 10,974,589 B2 | 4/2021 | Wetzel et al. | |
| 11,014,441 B2 | 5/2021 | Costa et al. | |
| 11,325,462 B2 | 5/2022 | Wetzel | |
| 11,358,466 B2 | 6/2022 | Dufendach et al. | |
| 11,440,789 B2 | 9/2022 | Wetzel et al. | |
| 2003/0184084 A1 | 10/2003 | Winship | |

(Continued)

*Primary Examiner* — Jason K Niesz

(74) *Attorney, Agent, or Firm* — Barnes & Thornburg

(57) ABSTRACT

A capless closure is provided for a tank filler pipe. The capless closure permits a fuel pump nozzle to be inserted into the tank filler pipe without first removing a fuel cap from the outer end of the tank filler pipe.

20 Claims, 4 Drawing Sheets

(56)        References Cited

U.S. PATENT DOCUMENTS

2006/0096662 A1*    5/2006    King ..................... B60K 15/04
                                                                141/367
2007/0000574 A1     1/2007    DeCapua
2007/0215240 A1     9/2007    Groom
2008/0022732 A1     1/2008    Mccarthy
2013/0341326 A1*    12/2013   Sasaki ................... B60K 15/04
                                                                220/203.06

* cited by examiner

UNDERPRESSURE CONTROLLER — 42
UNDERPRESSURE VALVE — 46

OVERPRESSURE CONTROLLER — 40
OVERPRESSURE VALVE — 44

OVERPRESSURE BYPASS DUCT

UNDERPRESSURE BYPASS DUCT

UNDERPRESSURE INLET DUCT

OVERPRESSURE BYPASS DUCT

OUTER FLAPPER DOOR

DOOR SUPPORT

DOOR PANEL

PERIMETER SEAL

22

68

72

64

76

INNER FLAPPER DOOR

DOOR SUPPORT

DOOR PANEL

PERIMETER SEAL

24

74

70

66

22

64L

64T

64

76

72

See Fig. 10

64B

78

22

64

64L

76

76E

64C

80

72C

CHEMICAL BOND

72F

MECHANICAL BOND

78

80A

CAPLESS CLOSURE ASSEMBLY FOR FUEL-TANK FILLER PIPE

CROSS REFERENCE TO RELATED APPLICATIONS

This application is a continuation of U.S. patent application Ser. No. 17/592,477, filed 3 Feb. 2022, which claims priority to and the benefit of U.S. Provisional Patent Application No. 63/145,974, filed 4 Feb. 2021 and U.S. Provisional Patent Application No. 63/177,173, filed 20 Apr. 2021, the disclosures of all of the foregoing being hereby expressly incorporated herein by reference.

BACKGROUND

The present disclosure relates to a closure for a tank filler pipe. More particularly, the present disclosure relates to a capless closure (1) that permits a fuel-dispensing pump nozzle to be inserted into a tank filler pipe to supply fuel to a fuel tank and (2) that closes the tank filler pipe when the fuel-dispensing pump nozzle is removed from the closure.

SUMMARY

According to the present disclosure, a fuel-tank filler apparatus comprises a filler pipe closure that is adapted to be coupled to a fuel-tank fuel filler pipe. The filler pipe closure is a capless system that includes a nozzle-insertion housing configured to mate with an outer end of a fuel filler pipe. The nozzle-insertion housing is formed to include an interior chamber between an outer flapper door and an inner flapper door mounted to the nozzle-insertion housing.

In illustrative embodiments, the nozzle-insertion housing includes an outer aperture that leads from atmosphere into the interior chamber and an inner aperture that leads from the interior chamber into the fuel filler pipe. The outer flapper door seals the outer aperture and the inner flapper door seals the inner aperture when the outer and inner flapper doors are in a normally closed position. Thus, the interior chamber of the nozzle-insertion housing is isolated from both atmosphere and the fuel filler pipe when the flapper doors are in the normally closed position.

In illustrative embodiments, the capless system includes pressure management means configured to relieve pressure in the fuel filler pipe over a preselected value by venting a flow of vapor from the fuel filler pipe to atmosphere through an overpressure path that bypasses the inner aperture, the internal chamber, and the outer aperture. The pressure management means is further configured to relieve vacuum developed in the fuel filler pipe over a preselected value by venting a flow of air from atmosphere to the fuel filler pipe through an underpressure path that bypasses the outer aperture, the internal chamber, and the inner aperture.

In illustrative embodiments, each flapper door includes a door panel and a perimeter seal overmolded onto the door panel to provide a gas-tight seal with the nozzle-insertion housing. The perimeter seal is fixed to the door panel via a chemically bonded interface and via a mechanical fastening feature. The chemically bonded interface provides a gas tight connection between the door panel and the perimeter seal. The mechanical fastening feature is integrated into the peripheral seal and mates with a correspondingly shaped channel in the door panel to retain the perimeter seal on the door panel. Integration of the perimeter seal with the door panel in this way provides means for blocking fuel vapor from permeating through the flapper doors through gaps or spaces that can develop between independent components.

Additional features of the present disclosure will become apparent to those skilled in the art upon consideration of the following detailed description of illustrative embodiments exemplifying the best mode of carrying out the present disclosure as presently perceived.

BRIEF DESCRIPTION OF THE DRAWINGS

The detailed description particularly refers to the accompanying figures in which.

DETAILED DESCRIPTION

Figures 1, 2, 3:
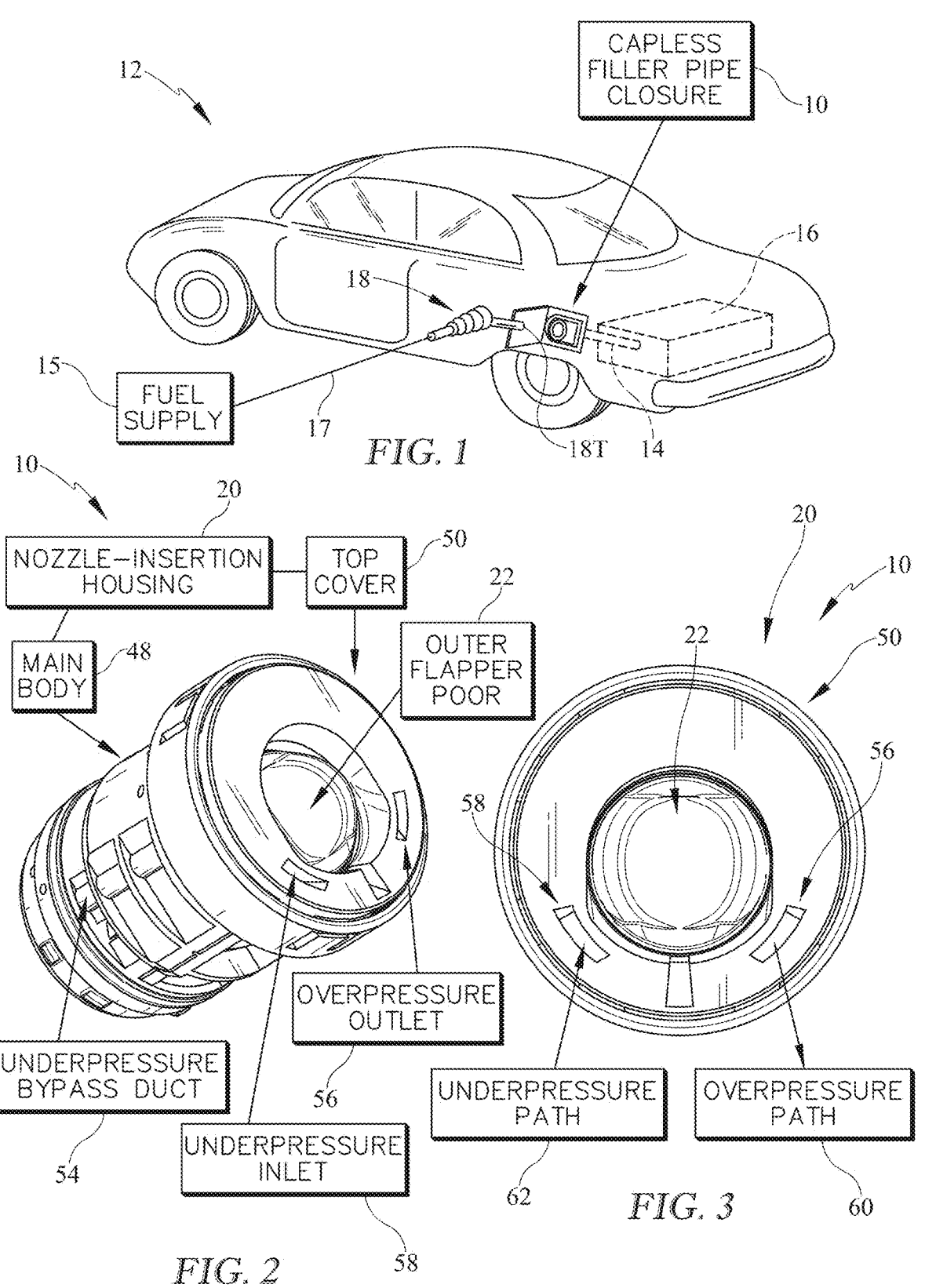
FIG. 1 is a perspective view showing an outer filler-pipe access door moved to an opened position relative to a vehicle body panel to expose an illustrative capless filler pipe closure that is coupled to a fuel filler pipe leading to a vehicle fuel tank and showing a fuel-dispensing pump nozzle that is coupled to a fuel supply and configured to be inserted into the capless filler pipe closure during vehicle refueling.
FIG. 2 is an enlarged perspective view of the capless filler pipe closure of FIG. 1 with an outer flapper door mounted to a nozzle-insertion housing to close off an interior cavity inside the nozzle-insertion housing into which the fuel-dispensing pump is inserted showing that the capless filler pipe closure includes pressure management means including an overpressure controller and an underpressure controller configured to regulate pressure in the fuel filler pipe via venting out/in to the fuel filler pipe through pathways that bypass the internal cavity of the nozzle-insertion housing so that fuel extant in the internal cavity is not disturbed by venting such that hydrocarbons in such extant fuel remain sealed in the internal cavity during operation of the vehicle.
FIG. 3 is an end view of the capless filler pipe closure of FIG. 2 showing that access to overpressure path and an underpressure path associated with the pressure management means open to atmosphere independent of one another and independent of an outer aperture opening into the internal cavity.

A capless filler pipe closure 10 is provided in a vehicle 12 to close off a fuel filler pipe 14 extending from a fuel tank 16 onboard vehicle 12 from the atmosphere until a fuel-dispensing pump nozzle 18 is inserted into closure 10 during fuel tank refueling as suggested in FIG. 1. Filler pipe closure 10 cooperates with fuel filler pipe 14 to conduct liquid fuel from nozzle 18 to fuel tank 16. Pump nozzle 18 is coupled to a fuel supply 15 by a hose 17.

Figure 4:
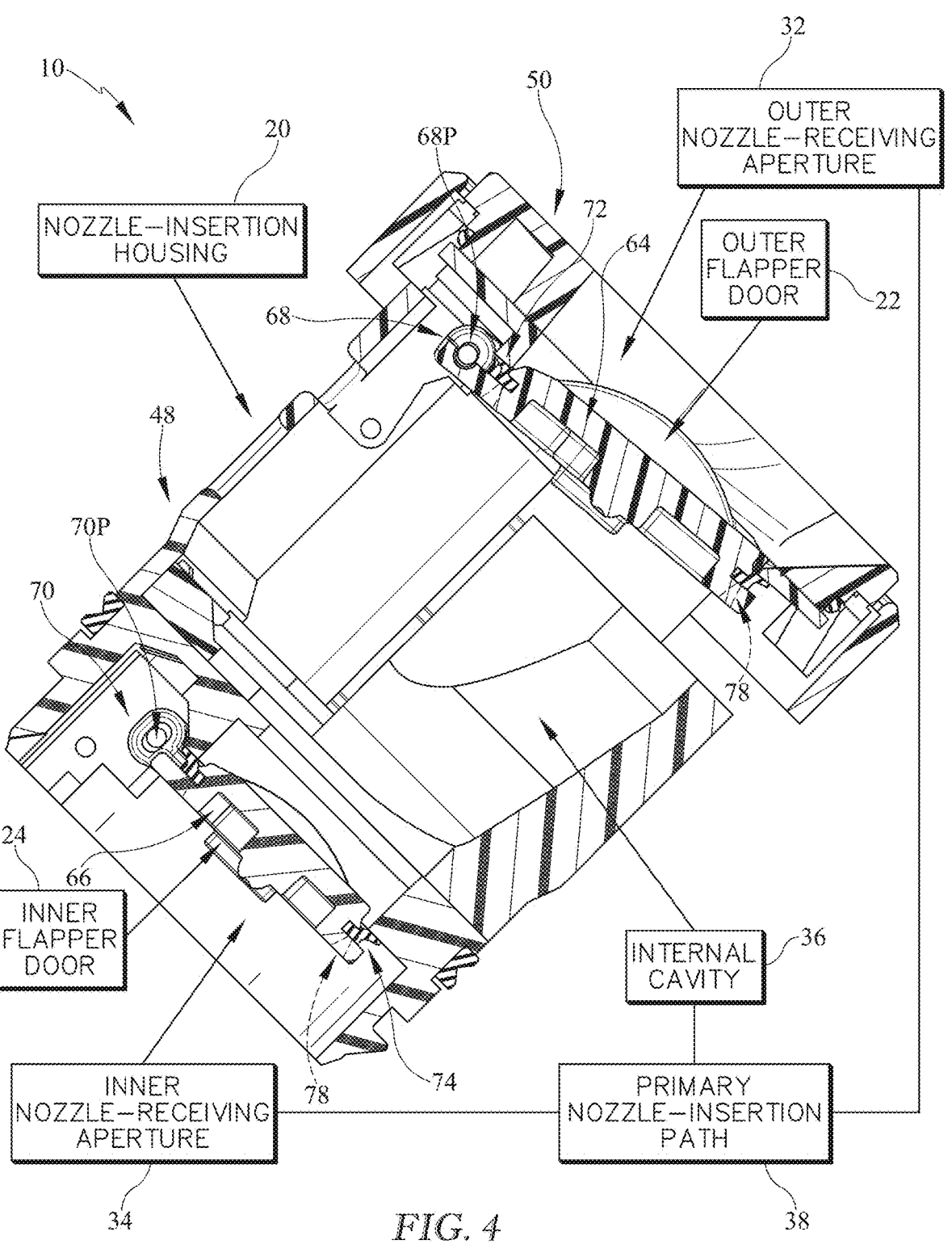
FIG. 4 is a cross-sectional view of the capless filler pipe closure of FIG. 2 showing that the capless filler pipe closure includes a nozzle-insertion housing, an outer flapper door closing off an outer aperture leading into the internal cavity of the nozzle-insertion housing, and an inner flapper door closing off an inner aperture leading from the internal cavity of the nozzle-insertion housing.
Figures 5, 6:
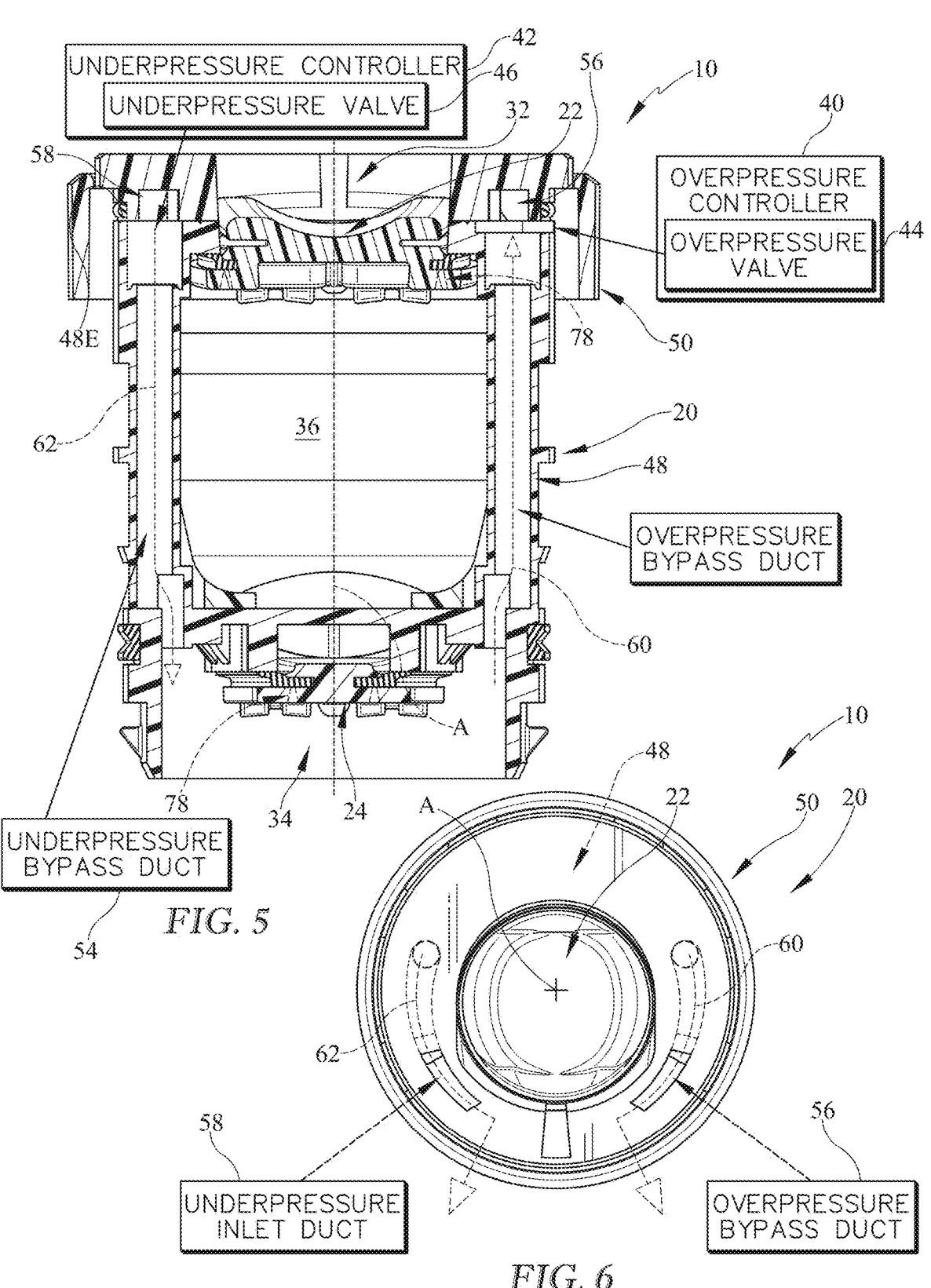
FIG. 5 is another cross-sectional view of the capless filler pipe closure of FIGS. 2 and 4 showing that the capless filler pipe closure includes a pressure management system including an overpressure controller and an underpressure controller that vent out from and in to the fuel filler pipe through pathways that bypass the internal cavity of the nozzle-insertion housing.
FIG. 6 is an end view of the capless filler pipe closure of FIG. 2 with a cover included in the nozzle-insertion housing broken away to show that an overpressure path and an underpressure path through the nozzle-insertion housing each extend circumferentially around a primary nozzle-insertion passage through the capless filler pipe closure without intersecting with the primary nozzle-insertion passage.

Capless filler pipe closure 10 is configured to close off fuel filler pipe 14 from the atmosphere until fuel-dispensing pump nozzle 18 is inserted into closure 10. Filler pipe closure 10 includes a nozzle-insertion housing 20 coupled to an outer end of fuel filler pipe 14. Nozzle-insertion housing 20 is formed to define a primary nozzle-insertion path 38 that extends from an outer nozzle-receiving aperture 32 to an inner nozzle-receiving aperture 34 as shown in FIGS. 4 and 5. During fuel tank refueling, a user inserts the fuel-dispensing pump nozzle 18 into outer nozzle-receiving aperture 32 of nozzle-insertion housing 20 until a distal tip 18T of nozzle 18 extends through inner nozzle-receiving aperture 34 of nozzle-insertion housing 20 to transfer fuel discharged by nozzle 18 to fuel tank 16 through fuel filler pipe 14.

Filler pipe closure 10 also includes outer and inner flapper doors 22, 24 and a pressure management system 26 as shown in FIGS. 2-5. Outer and inner flapper doors 22, 24 create an internal cavity 36 in nozzle-insertion housing 20 when outer and inner flapper doors 22, 24 are closed as shown in FIG. 4. Internal cavity 36 is sealed between the outer and inner flapper doors 22, 24 when outer and inner flapper doors 22, 24 are closed. Pressure management system 26 is configured to vent pressure and/or vacuum exceeding preselected values from fuel filler pipe 14 while bypassing vented gases around the internal cavity 36. By bypassing the internal cavity 36, vent gases leave any liquid fuel extant in the internal cavity 36 undisturbed keeping hydrocarbons from the extant liquid fuel trapped in the internal cavity 36.

In the illustrative embodiment, nozzle-insertion housing 20 includes an interior chamber 36 between outer flapper door 22 and inner flapper door 24 mounted to nozzle-insertion housing 20. Nozzle-insertion housing 20 includes outer aperture 32 that leads from atmosphere into interior chamber 36 and inner aperture 34 that leads from interior chamber 36 into fuel filler pipe 14. Outer flapper door 22 seals outer aperture 32 and inner flapper door 24 seals inner aperture 34 when outer and inner flapper doors 22, 24 are in a normally closed position as shown in FIG. 4. Thus, interior chamber 36 of nozzle-insertion housing 20 is isolated from both atmosphere and fuel filler pipe 14 when the outer and inner flapper doors 22, 24 are in the normally closed position.

Pressure management system 26 vents pressure in fuel filler pipe 14 over a preselected value by venting a flow of vapor from fuel filler pipe 14 to atmosphere through an overpressure path 60 that bypasses inner aperture 34, internal chamber 36, and outer aperture 32. Pressure management means 26 further relieves vacuum developed in fuel filler pipe 14 over a preselected value by venting a flow of air from atmosphere to fuel filler pipe 14 through an under-pressure path 62 that bypasses outer aperture 32, internal chamber 36, and inner aperture 34. By providing pathways 60, 62 that avoid primary nozzle-receiving pathway 38 fuel extant in internal cavity 36 is not disturbed by venting such that hydrocarbons in the extant fuel remain sealed in internal cavity 36.

Each flapper door 22, 24 includes a door panel 64, 66 and a perimeter seal 72, 74 overmolded onto the door panel 64, 66 to provide a gas-tight seal with nozzle-insertion housing 20. Perimeter seal 72 is substantially similar to perimeter seal 74. Perimeter seal 72 is fixed to the corresponding door panel 64 via a chemically bonded interface 72C and via a mechanical fastening feature 72F. The chemically bonded interface 72C provides a gas tight connection between the corresponding door panel 64 and perimeter seal 72. The mechanical fastening feature 72F is integrated into peripheral seal 72 and mates with a correspondingly shaped hole 80 in door panel 64 to retain perimeter seal 72 on door panel 64. Integration of the perimeter seal 72, 74 with the door panel 64, 66 in this way provides means for blocking fuel vapor from permeating through the flapper doors 64, 66 through gaps or spaces that can develop between independent components.

Designs in accordance with the present disclosure may provide over-pressure and/or under-pressure relief from a sealed capless assembly that is decoupled from the flapper doors. Moreover, by providing an overpressure pathway 60 and a separate underpressure pathway 62, each pathway 60, 62 can be governed by a single valve that is parallel to the flapper doors 22, 24 as compared to needing two doors 22, 24 in series as might be required for a single pathway for in/out venting.

Designs using independent overpressure and underpressure pathways 60, 62 can provide flexibility with valve performance, as it is simpler to meet various overpressure and underpressure requirements with one valve than it is with two valves in series. Use of overmolded door seals 72, 74 in a capless closure can benefit from providing pressure relief as described herein.

The decoupled pressure relief valve 44 in the overpressure controller 40 is located in the housing 20 of the capless unit 10 and connects the fuel tank 16 to the atmosphere by use of a duct 52 from the bottom of the housing 20 to the top. Overpressure travels up the duct 52 from the fuel filler pipe 14 to the valve 44. The valve 44 opens to outlet duct 56 in a front face of the top cover 50 of the housing 20 in response to pressure in the fuel filler pipe 14 exceeding a preselected threshold.

Underpressure travels in from the atmosphere through in inlet duct 58 formed in the top cover 50 of housing 20, down through the vacuum valve 46 and the duct 54, and into the fuel filler pipe 14 below the capless unit 10. The capless unit 10 is sealed on the outside diameter with a primary seal 74 on the bottom and a secondary seal 72 on the top. Likewise, the lower overmolded flapper door serves as the primary seal 74 with the upper overmolded door serving as a secondary system seal 72. The decoupled valve bypasses these seals 72, 74 and provides communication from the fuel tank 16 to the atmosphere through the described ducts 52, 54, 56, 58 using a sealed overmolded valve.

One purpose of the present disclosure is to improve sealing performance of capless closure assemblies used in fuel systems. By overmolding a seal 72, 74 onto the doors 22, 24 of the capless closure 10, a leak path between the door 22, 24 and the seal 72, 74 can be eliminated. This may help prevent any microleaks in the system and lead to improved hydrocarbon emissions results. In addition, with the rubber overmolded to the door 22, 24, there is reduced concern for the seal 72, 74 from being displaced by the nozzle 18 or any other means. Finally, because it is overmolded, fuel swell is less of an issue due to the seal 72, 74 being adhered to the door 22, 24 and swell being mitigated.

A capless fuel filler pipe closure 10 for use in a vehicle 12 is shown in FIGS. 2 and 3. Capless fuel filler pipe closure 10 includes a nozzle-insertion housing 20, outer and inner flapper doors 22, 24 coupled to nozzle-insertion housing 20, and pressure management means 26 as shown in FIGS. 2-6. Nozzle-insertion housing 20 includes an outer nozzle-receiving aperture 32, an inner nozzle-receiving aperture 34 spaced from outer nozzle-receiving aperture 32, and an internal cavity 36 arranged between outer aperture 32 and inner aperture 34. Pressure management means 26 is configured to regulate pressure in fuel filler pipe 14 via venting out/in to fuel filler pipe 14 through at least one pathway 28, 30 that bypasses interior cavity 36 of nozzle-insertion housing 20 so that fuel extant in internal cavity 36 is not disturbed by venting such that hydrocarbons in the extant fuel remain sealed in internal cavity 36 during operation of vehicle 12.

Outer flapper door 22 is coupled to nozzle-insertion housing 20 to move from a normally closed position as shown in FIG. 5 and an opened position (not shown). In the normally closed position, outer flapper door 22 seals outer aperture 32. In the opened position, outer flapper door 22 is spaced apart from outer aperture 32 to allow access to internal cavity 36 upon insertion of a fuel dispensing nozzle 18 through outer aperture 32.

Inner flapper door 24 is coupled to nozzle-insertion housing 20 to move from a normally closed position as shown in FIG. 5 to an opened position (not shown). In the normally closed position, inner flapper door 24 seals inner aperture 34. In the opened position, inner flapper door 24 is spaced apart from inner aperture 34 to allow access to fuel filler pipe 14 upon insertion of fuel dispensing nozzle 18 through inner aperture 34.

Pressure management means 26 includes an overpressure controller 40 and/or an underpressure controller 42 as shown in FIG. 5. Overpressure controller 40 includes a pressure-activated valve 44 located along an overpressure path through nozzle-insertion housing 20. Underpressure controller 42 includes a pressure-activated valve 46 located along an underpressure path through nozzle-insertion housing 20. Both overpressure path 60 and underpressure path 62 are independent of a primary nozzle-insertion path 38 through outer aperture 32, interior cavity 36, and inner aperture 34. Underpressure path 62 is independent of overpressure path 60 as shown in FIG. 5. In other embodiments it may be possible that part or all of underpressure path 62 overlaps overpressure path 60.

Nozzle-insertion housing 20 includes an inner section 48 and an outer section 50 coupled to an end 48E of inner section 48 as shown in FIG. 2-5. Inner section, or main body 48, is shaped to define an overpressure bypass duct 52 forming a portion of the overpressure path 60 and an underpressure bypass duct 54 forming a portion of the underpressure path 62 as shown in FIG. 5. Outer section, or top cover 50, is shaped to define an overpressure outlet duct 56 in fluid communication with the overpressure bypass duct 52 that forms another portion of the overpressure path 60 and an underpressure inlet duct 58 in fluid communication with the underpressure bypass duct 54 that forms another portion of the underpressure path 62.

During an overpressure event, i.e. where vapor pressure in fuel filler pipe 14 exceeds a preselected pressure threshold, the flow of fuel vapor travels from fuel filler pipe 14 through the overpressure bypass duct 52 to the pressure-activated valve 44 in overpressure controller 40. Valve 44 controls the flow of fuel vapor into the overpressure outlet duct 56 in response to pressure in the fuel filler pipe 14 exceeding a preselected threshold.

During an underpressure event, i.e. when a vacuum develops in fuel filler pipe 14 over a preselected value, the flow of air from the atmosphere travels from the atmosphere through the underpressure inlet duct 58 to the vacuum valve 46. The flow of air flows through valve 46 and the duct 54 to fuel filler pipe 14 below filler pipe closure 10.

Overpressure bypass duct 52 and underpressure bypass duct 54 both extend axially relative to an axis A of closure 10 as shown in FIG. 5. In this way, overpressure bypass duct 52 and underpressure bypass duct 54 are parallel to primary nozzle-insertion path 38 through outer aperture 32, interior cavity 36, and inner aperture 34. Overpressure outlet duct 56 and underpressure inlet duct 58 extend at least circumferentially partway around outer aperture 32 relative to axis A of closure 10 as shown in FIGS. 3 and 6. In this way, overpressure outlet duct 56 and underpressure inlet duct 58 direct either the flow of fuel vapor or the flow of air around outer aperture 32 as shown in FIGS. 3 and 6.

Figures 7, 8, 9, 10:
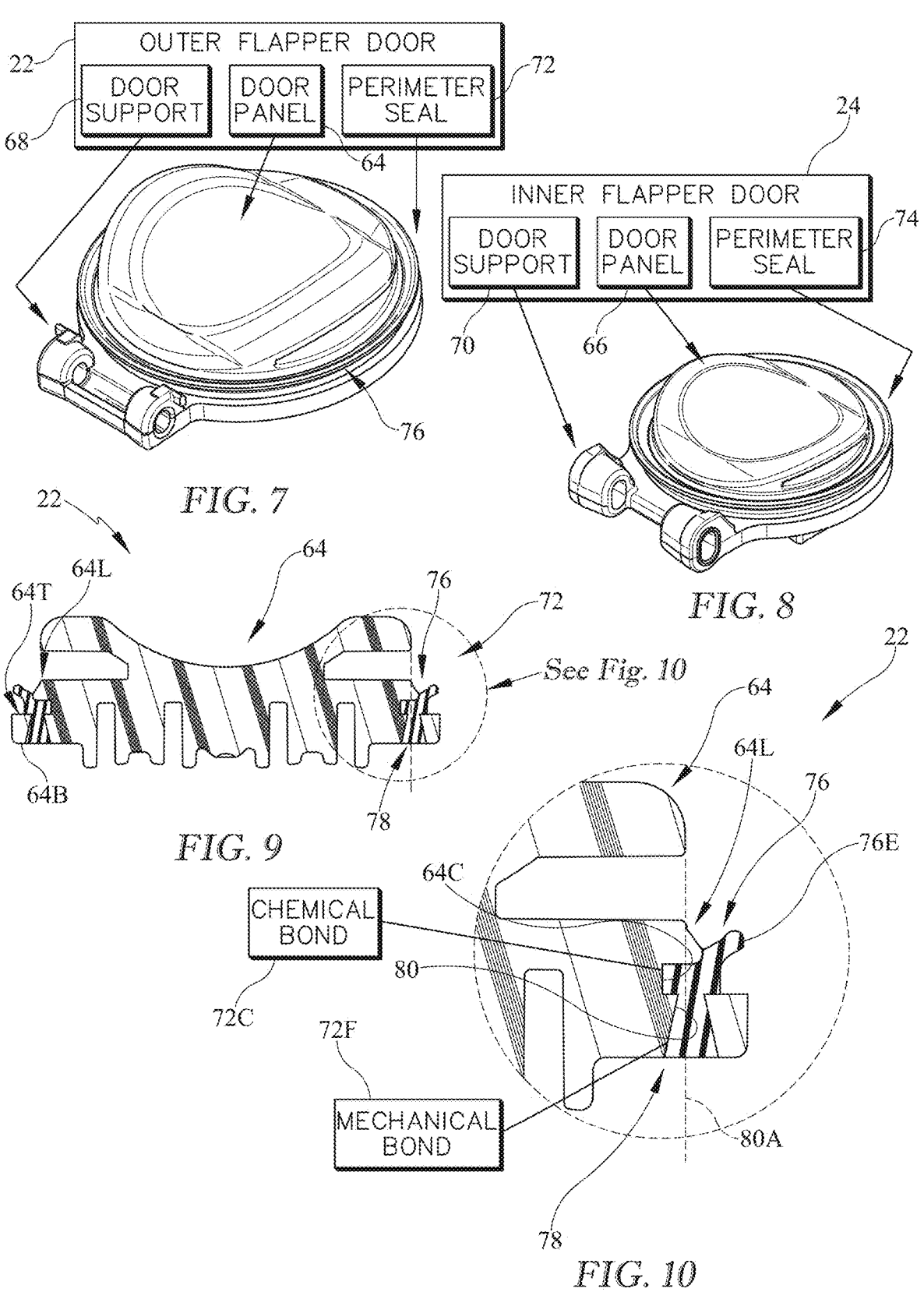
FIG. 7 is a detail perspective view of the outer flapper door showing that the outer flapper door includes a door panel comprising conductive polyphalamide (PPA) materials and a perimeter seal comprising fluorocarbon (FKM) rubber.
FIG. 8 is a detail perspective view of the inner flapper door showing that the inner flapper door includes a door panel comprising conductive polyphalamide (PPA) materials and a perimeter seal comprising fluorocarbon (FKM) rubber.
FIG. 9 is a cross-sectional view representative of the outer flapper door and the inner flapper door showing the perimeter seal overmolded onto the door panel to couple the components.
FIG. 10 is a detail view of a portion of FIG. 9 showing the perimeter seal is fixed to the door panel via a chemically bonded interface and via a mechanical fastening feature (bond).

Outer flapper door 22 and inner flapper door 24 each include a door panel 64, 66, a door support 68, 70, and a perimeter seal 72, 74 as shown in FIGS. 7 and 8. Door support 68, 70 extends from the corresponding door panel 64, 66 to nozzle-insertion housing 20 and is pivotally coupled the corresponding door panel 64, 66 to nozzle-insertion housing 20 by a pin 68P, 70P. Pressure seals 68, 70 are overmolded onto a top side 64T, 66T of the corresponding door panel 64, 66 to provide a gas-tight seal with nozzle-insertion housing 20. In the illustrative embodiment, door panels 64, 66 and door supports 68, 70 comprise conductive polyphalamide (PPA) materials and perimeter seals 72, 74 comprise fluorocarbon (FKM) rubber.

Door panel 64 of outer flapper door 22 is substantially similar to door panel 66 of inner flapper door 24. Door panel 64 of outer flapper door 22 is shaped to define a top side 64T, a bottom side 64B opposite top side 64T, and a lip 64L as shown in FIGS. 9 and 10. Lip 64L extends from top side 64T to form a channel 64C. A portion of perimeter seal 72 is arranged in channel 64C as shown in FIGS. 9 and 10.

Perimeter seal 72 is substantially similar to perimeter seal 74. Each perimeter seal 72, 74 is fixed to the corresponding door panel 64, 66 by a chemically bonded interface 72C and a mechanical fastening feature 72F as shown in FIG. 10.

Perimeter seal 72 includes an o-ring 76 and a plurality of protrusions 78 as shown in FIGS. 9 and 10. O-ring 76 is arranged on top side 64T of door panel 64 so that a distal end 76E of seal 68 engages nozzle-insertion housing 20 when outer flapper door 22 is in the closed position. Protrusions 78 extend from o-ring 76 opposite the distal end 76E. Protrusions 78 extend from o-ring 76 through door panel 64 to bottom side 64B of door panel 64 so as to provide the mechanical fastening feature 68F and further secure seal 68 to door panel 64. The protrusions 78 are illustratively frustoconical in shape and extend from an underside of the O-ring 76 at circumferentially spaced apart locations. In other embodiments, the protrusions 78 may have other shapes. In certain instances, the protrusions 78 may be larger at locations spaced from the underside of the O-ring 76 so as to support coupling.

In the illustrative embodiment, door panel 64 has holes 80 that extend through top side 64T of door panel 64 to bottom side 64B along a hole axis 80A. Holes 80 have a taper along the hole axis 80A such that an opening of hole 80 at the bottom side 64B of door panel 64 has a greater cross-sectional area than an opening of hole 80 at the tope side 64T of door panel 64 as shown in FIG. 10. In this way, the seal 72 is blocked from movement relative to door panel 64 by protrusions 78 as well as the chemical bond 72C.

The invention claimed is:

1. A capless fuel filler pipe closure for use in a vehicle, the closure comprising a nozzle-insertion housing including an outer aperture, an inner aperture spaced from the outer aperture, and an internal cavity arranged between the outer aperture and the inner aperture, an outer flapper door coupled to the nozzle-insertion housing to move from a normally closed position sealing the outer aperture to an opened position upon insertion of a fuel dispensing nozzle through the outer aperture, an inner flapper door coupled to the nozzle-insertion housing to move from a normally closed position sealing the inner aperture to an opened position upon insertion of the fuel dispensing nozzle through the inner aperture, and an overpressure controller including a pressure-activated valve located along an overpressure path through the nozzle-insertion housing that is independent of a primary nozzle-insertion path through the outer aperture, the internal cavity, and the inner aperture, wherein the nozzle-insertion housing includes an inner section and an outer section coupled to an end of the inner section, the inner section shaped to define an overpressure bypass duct forming a portion of the overpressure path, and the outer section shaped to define an overpressure outlet duct in fluid communication with the overpressure bypass duct that forms another portion of the overpressure path, wherein the overpressure bypass duct extends axially relative to an axis of the closure so that the overpressure bypass duct is parallel to the primary nozzle-insertion path through the outer aperture, the internal cavity, and the inner aperture, and wherein the overpressure outlet duct extends at least circumferentially partway around the outer aperture relative to the axis of the closure so that the overpressure outlet duct directs the flow of fuel vapor around the outer aperture.

2. The closure of claim 1, wherein the outer flapper door and the inner flapper door each include a door panel and a perimeter seal overmolded onto a top side of the door panel to provide a gas-tight seal with the nozzle-insertion housing, and wherein the perimeter seal is fixed to the door panel by a chemically bonded interface and a mechanical fastening feature.

3. The closure of claim 2, wherein the door panel comprises conductive polyphalamide materials and the perimeter seal comprises fluorocarbon rubber.

4. The closure of claim 2, wherein the perimeter seal includes an o-ring arranged on the top side of the door panel and a plurality of protrusions that extend from the o-ring through the door panel to a bottom side of the door panel so as to provide the mechanical fastening feature.

5. The closure of claim 4, wherein the door panel is shaped to define a lip that extends from the top side of the door panel to form a channel and a portion of the perimeter seal is arranged in the channel.

6. The closure of claim 5, wherein the door panel is shaped to include holes that each extend along a hole axis through the top side of the door panel to the bottom side of the door panel, each of the holes tapers along the hole axis such that an opening of each hole at the bottom side of the door panel has a greater cross-sectional area than an opening of each hole at the top side of the door panel, and a protrusion included in the plurality of protrusions is arranged in one of the holes.

7. A capless fuel filler pipe closure for use in a vehicle, the closure comprising a nozzle-insertion housing including an outer aperture, an inner aperture spaced from the outer aperture, and an internal cavity arranged between the outer aperture and the inner aperture, an outer flapper door coupled to the nozzle-insertion housing to move from a normally closed position sealing the outer aperture to an opened position upon insertion of a fuel dispensing nozzle through the outer aperture, an inner flapper door coupled to the nozzle-insertion housing to move from a normally closed position sealing the inner aperture to an opened position upon insertion of the fuel dispensing nozzle through the inner aperture, and an overpressure controller including a pressure-activated valve located along an overpressure path through the nozzle-insertion housing that is independent of a primary nozzle-insertion path through the outer aperture, the internal cavity, and the inner aperture, wherein the nozzle-insertion housing is shaped to define an overpressure bypass duct forming a portion of an overpressure path and an overpressure outlet duct in fluid communication with the overpressure bypass duct that forms another portion of the overpressure path, and wherein the overpressure outlet duct extends at least circumferentially partway around the outer aperture relative to an axis of the closure so that the overpressure outlet duct directs the flow of fuel vapor around the outer aperture.

8. The closure of claim 7, wherein the overpressure bypass duct and the overpressure outlet duct are independent of the primary nozzle-insertion path through the outer aperture, interior cavity, and the inner aperture of the nozzle-insertion housing.

9. The closure of claim 7, wherein the overpressure bypass duct extends axially relative to the axis of the closure so that the overpressure bypass duct is parallel to a primary nozzle-insertion path through the outer aperture, the internal cavity, and the inner aperture.

10. The closure of claim 9, wherein the nozzle-insertion housing includes an inner section and an outer section coupled to an end of the inner section, the inner section shaped to define the overpressure bypass duct, and the outer section shaped to define the overpressure outlet duct.

11. The closure of claim 7, wherein the outer flapper door and the inner flapper door each include a door panel and a perimeter seal overmolded onto a top side of the door panel to provide a gas-tight seal with the nozzle-insertion housing, and wherein the perimeter seal is fixed to the door panel by a chemically bonded interface and a mechanical fastening feature.

12. The closure of claim 11, wherein the perimeter seal includes an o-ring arranged on the top side of the door panel and a plurality of protrusions that extend from the o-ring through the door panel to a bottom side of the door panel so as to provide the mechanical fastening feature.

13. The closure of claim 12, wherein the door panel is shaped to define a lip that extends from the top side of the door panel to form a channel and a portion of the perimeter seal is arranged in the channel.

14. A capless fuel filler pipe closure for use in a vehicle, the closure comprising a nozzle-insertion housing including an outer aperture, an inner aperture spaced from the outer aperture, and an internal cavity arranged between the outer aperture and the inner aperture, an outer flapper door coupled to the nozzle-insertion housing to move from a normally closed position sealing the outer aperture to an opened position upon insertion of a fuel dispensing nozzle through the outer aperture, an inner flapper door coupled to the nozzle-insertion housing to move from a normally closed position sealing the inner aperture to an opened position upon insertion of the fuel dispensing nozzle through the inner aperture, and pressure management means configured to regulate pressure in a fuel filler pipe via venting out to the fuel filler pipe through at least one pathway that bypasses the internal cavity of the nozzle-insertion housing so that fuel extant in the internal cavity is not disturbed by venting such that hydrocarbons in the extant fuel remain sealed in the internal cavity during operation of the vehicle, wherein the nozzle-insertion housing is shaped to define an overpressure bypass duct forming a portion of an overpressure path and an overpressure outlet duct in fluid communication with the overpressure bypass duct that forms another portion of the overpressure path, and wherein the overpressure outlet duct extends at least circumferentially partway around the outer aperture relative to an axis of the closure so that the overpressure outlet duct directs the flow of fuel vapor around the outer aperture.

15. The closure of claim 14, wherein the outer flapper door and the inner flapper door each include a door panel and a perimeter seal overmolded onto a top side of the door panel to provide a gas-tight seal with the nozzle-insertion housing, and wherein the perimeter seal is fixed to the door panel by a chemically bonded interface and a mechanical fastening feature.

16. The closure of claim 14, wherein the pressure management means includes an overpressure controller configured to control a flow of fuel vapor through the overpressure bypass duct.

17. The closure of claim 16, wherein the overpressure controller includes a pressure-activated valve located at an outlet of the overpressure bypass duct.

18. The closure of claim 14, wherein the overpressure bypass duct extends axially relative to the axis of the closure so that the overpressure bypass duct is parallel to a primary nozzle-insertion path through the outer aperture, the internal cavity, and the inner aperture.

19. The closure of claim 18, wherein the nozzle-insertion housing includes an inner section and an outer section coupled to an end of the inner section, the inner section shaped to define the overpressure bypass duct, and the outer section shaped to define the overpressure outlet duct.

20. The closure of claim 18, wherein the overpressure bypass duct is independent of the primary nozzle-insertion path through the outer aperture, interior cavity, and the inner aperture of the nozzle-insertion housing.

* * * * *